Oct. 9, 1934.   R. S. TROTT   1,975,909
ENGINE MOUNTING
Filed Nov. 10, 1931

Inventor
Rolland S. Trott
Attorney

Patented Oct. 9, 1934

1,975,909

UNITED STATES PATENT OFFICE 1,975,909

ENGINE MOUNTING

Rolland S. Trott, Denver, Colo.

Application November 10, 1931, Serial No. 574,175

4 Claims. (Cl. 248—14.2)

My invention relates to engine mountings for mounting engines upon frames or supports and providing pivotal and orbital vibration cushioning movements therefor, and is a continuation in part of my application Serial No. 321,634, filed November 24, 1928, now Patent No. 1,890,871, granted December 13, 1932.

In my former invention two weight supporting mountings of the engine unit provide an axis of oscillation, and a resilient stabilizer connection between the engine unit and a part of the vehicle acts to control the pivotal movements about said axis.

It is the object of this invention to provide a compound cushioning pivotal construction which may be used for the rear weight supporting mounting.

A further object is to provide a weight supporting mounting having combined metallic and non-metallic resilient supporting means, thereby providing a wide range of possible periodicity for the mounting, so that it may correspond to any period of vibration of the engine unit.

I accomplish these objects by providing a mounting construction composed of steel resilient means combined with non-metallic resilient means and a pivotal construction.

By proper proportioning of the metallic and the non-metallic resilient means, corresponding vibration periods may thus be provided for all the vibration periods of the engine unit. All of this is described below and is illustrated in the drawing in which.

Figure 1:
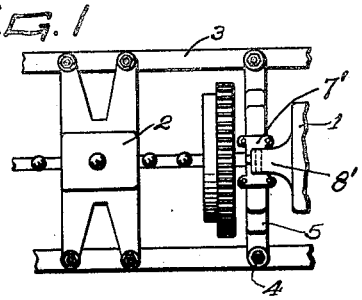
Figure 1 is a fragmentary detail of a portion of a motor vehicle showing in plan my compound metallic and non-metallic pivotal mounting.

In Figure 1, the engine 1 is shown separate from the transmission 2.

Figure 4:
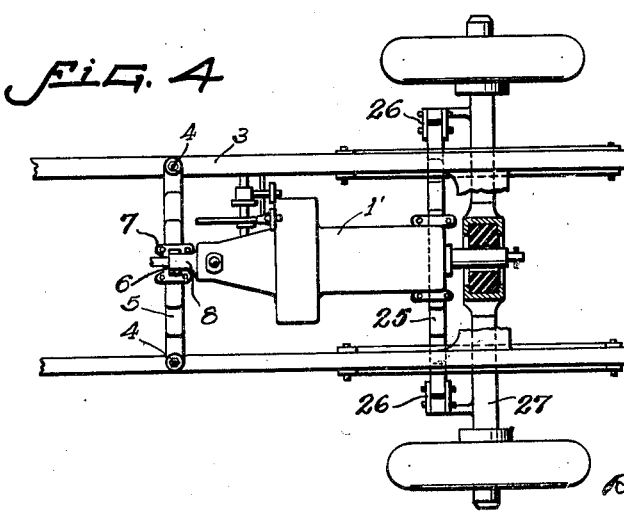
Figure 4 is a plan view of a portion of a motor vehicle having a rear mounting composed of a combination of the leaf spring shown in Figure 1, the cushion pivotal mounting shown in Figure 2, and the weight supporting mounting shown in Figure 3.

In Figure 4, the engine and transmission form a single engine unit 1' mounted at the front on a cross spring 25 fixed to the engine unit 1' and supported by shackles 26 on the front axle 27, and said engine unit is mounted at the rear upon the frame 3, by the cushion mountings 4, the spring 5 and the cushion pivotal mounting 6.

Figure 2:
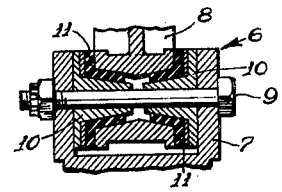
Figure 2 is a fragmentary detail in section showing one form of cushion pivotal mounting.

The mounting 6, shown in detail in Fig. 2, is composed of the bracket 7, attached in any proper manner to the spring 5, and supporting the engine bracket 8 by the pivot bolt 9, the thimbles 10, and the rubber or non-metallic pieces 11.

Figure 1A:
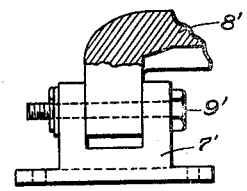
Figure 1a is a fragmentary detail in side elevation partly in section of the pivotal mounting shown in Figure 1.

The pivotal mounting shown in Figure 1a, has the bracket 7' to be attached in any proper manner to the spring 5 and having the pivot bolt 9' supporting the engine bracket 8'.

Figure 3:
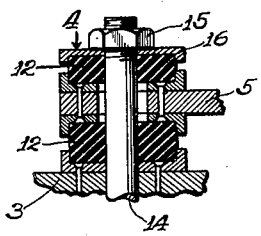
Figure 3 is a fragmentary detail in section showing one form of cushioned weight supporting mounting.

In Figure 3, the non-metallic cushion members 12 above and below each end of the spring 5 act to hold the spring 5 in resilient contact with the frame 3. Such contact being maintained by the bolt 14, the nut 15, and the washer 16.

Any other form and construction of cushioned pivotal mounting may be employed so long as the results provide a substantially pivotal movement combined with proper cushioning.

Any other proper form, construction, or type of metallic resilient support means may be employed, so long as the final result is the providing a mounting means whose periodicity may be controlled by proper design, material, construction of the metallic resilient support, and treatment.

Any proper mounting means may be provided other than the cushion means shown to support the metallic resilient means upon the frame, as long as the result is a satisfactory and reliable construction. That is, it may be that with proper cushion pivotal means and proper metallic resilient means, resilient support means on the frame may not be required.

At any rate, the final result to be achieved is a mounting composed of metallic resilient means and non-metallic resilient means combined in such a way as to provide any and all periodicities which the vibration of the engine unit in question may produce.

Having now described my invention, which I claim is new and desire to protect by Letters Patent, is as follows:

1. Means for mounting an engine unit in a motor vehicle, which engine unit has a tendency to oscillate about a longitudinal axis in response to impulses incident to the operation thereof, comprising resilient supporting means for the rear end portion of said engine unit having a free pivotal connection therewith, and resilient supporting means for the front end portion of said engine unit constructed and arranged to provide for but resiliently oppose oscillation of the engine unit.

2. Means for mounting an engine unit in a motor vehicle, which engine unit has a tendency to oscillate about a longitudinal axis in response to impulses incident to the operation thereof, comprising a metallic resilient spring, a free pivotal connection supporting the rear end portion of the engine unit on said spring, and resilient supporting means for the front end portion of said engine unit constructed and arranged to provide for but resiliently oppose oscillation of the engine unit.

3. Means for mounting an engine unit in a motor vehicle, which engine unit has a tendency to oscillate about a longitudinal axis in response to impulses incident to the operation thereof, comprising a leaf-spring, a free pivotal connection supporting the rear portion of the engine unit on said spring, non-metallic resilient means supporting said spring on the vehicle, and resilient supporting means for the front end portion of the engine unit constructed and arranged to provide for but resiliently oppose oscillation of the engine unit, the pivotal connection and resilient supporting means being so arranged as to locate the axis of oscillation approximately in the longitudinal central vertical plane of the engine unit.

4. Means for mounting an engine on a frame of a motor vehicle, which engine has a tendency to oscillate about a longitudinal axis in response to impulses incident to the operation thereof, comprising metallic resilient supporting means for the rear portion of said engine having a free pivotal connection therewith, non-metallic cushion means supported by the frame and supporting said metallic resilient supporting means, and resilient supporting means for the front end portion of said engine constructed and arranged to provide for but resiliently oppose oscillation of the engine.

ROLLAND S. TROTT.